June 5, 1928.

J. S. WILLIAMSON

COOKER

Filed Sept. 10, 1927

1,672,742

Inventor

J. S. Williamson

By Victor J. Evans

Attorney

Patented June 5, 1928.

1,672,742

UNITED STATES PATENT OFFICE.

JAMES S. WILLIAMSON, OF BEAMAN, MISSOURI.

COOKER.

Application filed September 10, 1927. Serial No. 218,716.

It is the object of the present invention to provide a cooker embodying a pan adapted to receive feed for animals, with means for supporting the pan within the cooker in spaced relation to the bottom thereof, to prevent burning of the feed as well as the pan when left unattended.

In carrying out the invention, the feed receiving pan is supported within a water container located within the cooker, the feed pan being spaced from the walls of the water container, thus permitting the circulation of water about the feed pan, means being provided for withdrawing the water from the container if so desired.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein.

Figure 1:
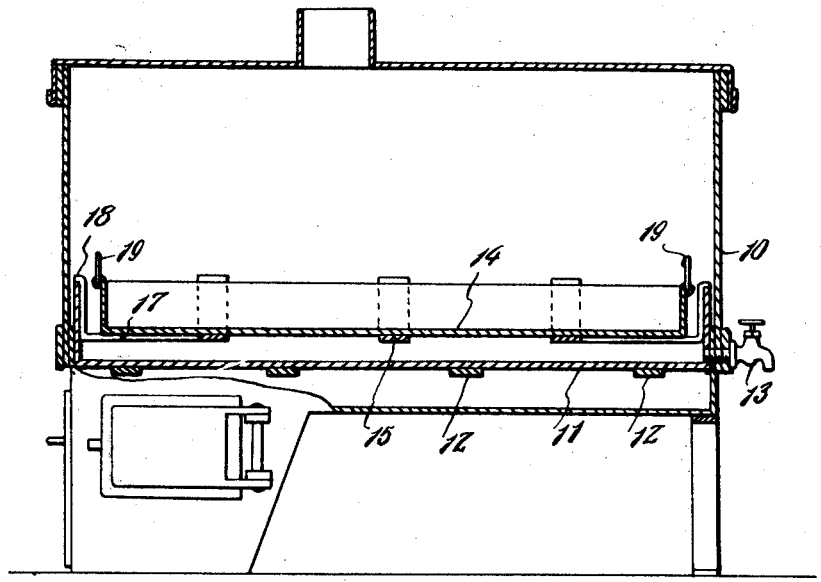
Figure 1 is a vertical sectional view through the cooker constructed in accordance with the present invention.
Figure 2:
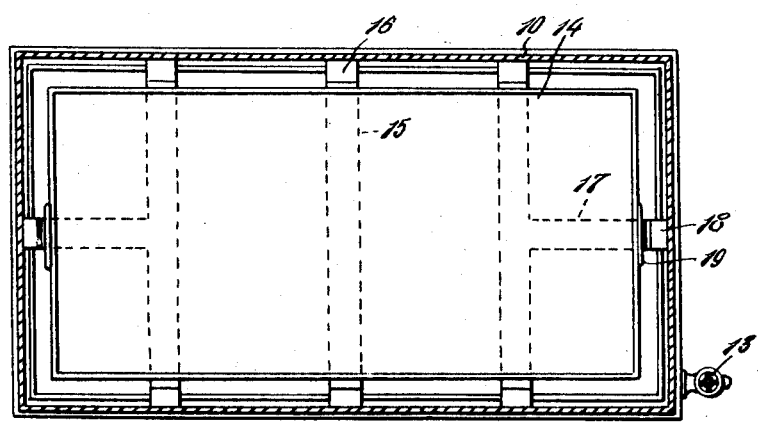
Figure 2 is a horizontal sectional view therethrough.

Referring to the drawing in detail 10 indicates a cooker of any suitable construction, and one which may also vary in size and cross sectional configuration without departing from the spirit of the invention. Arranged within this cooker is a water container 11 supported on cleats 12. Arranged at one side of the cooker is a faucet 13 which communicates with the water container, so that the water from the latter can be withdrawn at any time desired.

A feed receiving pan is indicated at 14 and is adapted to be positioned within the water container 11 and arranged in spaced relation to the side and end walls of the latter, thus permitting for the circulation of water about the pan 14. By reason of this construction the feed placed within the pan can be left unattended while being cooked, without any danger of the feed or the bottom of the pan 14 being burned.

While any suitable means may be employed for supporting the pan 14 within the water container 11, I preferably employ substantially U-shaped brackets 15, the parallel portions of which are bent over and suspended from the adjacent side walls of the water container as at 16. Bracket arms 17 also project from the end walls of the water container beneath the bottom of the pan 14, and each of these brackets is provided with a substantially U-shaped portion adapted to straddle the adjacent end wall of the water container. The pan 14 is removably supported within the water container and is provided with handles 19, so that it can be readily and easily placed within the water container or removed therefrom.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

In combination, a cooker, a water container located therein and including side and end walls spaced from the adjacent walls of the cooker, substantially U-shaped brackets arranged within the container transversely thereof, the upper ends of each bracket being bent upon themselves to straddle the upper edges of said side walls, bracket arms extending from the two outermost brackets in the direction of the end walls and forming integral parts of said brackets, said arms being extended upwardly parallel with the end walls and terminating to straddle said end walls, and a feed receiving pan located within the container and supported by said brackets in spaced relation to the walls of the container.

In testimony whereof I affix my signature.

JAMES S. WILLIAMSON.